US012339366B2

(12) United States Patent
Chai et al.

(10) Patent No.: US 12,339,366 B2
(45) Date of Patent: Jun. 24, 2025

(54) LiDAR-DRIVEN mmWAVE BEAM MANAGEMENT

(71) Applicant: NEC Laboratories America, Inc., Princeton, NJ (US)

(72) Inventors: Eugene Chai, Monmouth Junction, NJ (US); Karthikeyan Sundaresan, Manalapan, NJ (US); Mohammad Khojastepour, Lawrenceville, NJ (US); Timothy Woodford, La Jolla, CA (US)

(73) Assignee: NEC Corporation, Tokyo (JP)

( * ) Notice: Subject to any disclaimer, the term of this patent is extended or adjusted under 35 U.S.C. 154(b) by 792 days.

(21) Appl. No.: 17/575,193

(22) Filed: Jan. 13, 2022

(65) Prior Publication Data

US 2022/0229187 A1    Jul. 21, 2022

Related U.S. Application Data

(60) Provisional application No. 63/137,934, filed on Jan. 15, 2021.

(51) Int. Cl.
*G01S 17/89* (2020.01)
*G01S 7/48* (2006.01)
*G01S 7/481* (2006.01)

(52) U.S. Cl.
CPC ............ *G01S 17/89* (2013.01); *G01S 7/4808* (2013.01); *G01S 7/4811* (2013.01)

(58) Field of Classification Search
None
See application file for complete search history.

(56) References Cited

U.S. PATENT DOCUMENTS

| 10,679,530 B1 | 6/2020 | Schmalenberg et al. |
| 2019/0238658 A1* | 8/2019 | Shimizu ............... H04W 4/46 |
| 2021/0044366 A1* | 2/2021 | Cody .................. G06T 17/20 |

FOREIGN PATENT DOCUMENTS

| EP | 3691307 A1 | 8/2020 |
| WO | 2020114595 A1 | 6/2020 |

OTHER PUBLICATIONS

Wang, Song, et al. "Demystifying millimeter-wave V2X: Towards robust and efficient directional connectivity under high mobility", InProceedings of the 26th Annual International Conference on Mobile Computing and Networking. Sep. 2020, pp. 1-14.
Wei, Teng, et al. "Facilitating Robust 60 {GHz} Network Deployment by Sensing Ambient Reflectors", In14th USENIX Symposium on Networked Systems Design and Implementation (NSDI 17). Mar. 2017, pp. 212-226.

(Continued)

*Primary Examiner* — Luke D Ratcliffe
(74) *Attorney, Agent, or Firm* — Joseph Kolodka

(57) ABSTRACT

A method is provided for beam management. The method includes obtaining, by a Light Detection and Radar (LiDAR) sensor having one or more LiDAR cameras performing ray-tracing, out-of-band infrared measurements of a surrounding environment. The method further includes selecting, by a base station, a transmission and reception beam pair for use in the surrounding environment from a plurality of available transmission and reception beam pairs responsive to the out-of-band measurements of the surrounding environment.

18 Claims, 6 Drawing Sheets

(56) References Cited

OTHER PUBLICATIONS

Zhou, Anfu, et al. "Robotic millimeter-wave wireless networks", IEEE/ACM Transactions on Networking. May 19, 2020, pp. 1534-1549.

Zhou, Anfu, et al. "Beam-forecast: Facilitating mobile 60 GHz networks via model-driven beam steering", InIEEE Infocom 2017—IEEE Conference on Computer Communications. May 1, 2017, pp. 1-9.

Nitsche, Thomas, et al. "Steering with eyes closed: mm-wave beam steering without in-band measurement", In2015 IEEE Conference on Computer Communications (INFOCOM). Apr. 26, 2015, pp. 2416-2424.

Wei, Teng, et al. "Pose information assisted 60 ghz networks: Towards seamless coverage and mobility support", InProceedings of the 23rd Annual International Conference on Mobile Computing and Networking. Oct. 2017, pp. 42-55.

Dias, Marcus, et al. "Position and LIDAR-aided mmWave beam selection using deep learning", In2019 IEEE 20th International Workshop on Signal Processing Advances in Wireless Communications (SPAWC). Jul. 2, 2019, pp. 1-5.

Ali, Anum, et al. "Passive radar at the roadside unit to configure millimeter wave vehicle-to-infrastructure links", IEEE Transactions on Vehicular Technology. Oct. 23, 2019, pp. 1-30.

Gonzalez-Prelcic, Nuria, et al. "Radar aided beam alignment in mmWave V2I communications supporting antenna diversity", In2016 Information Theory and Applications Workshop (ITA). Jan. 31, 2016, pp. 1-7.

Degli-Esposti, Vittorio, et al. "Ray-tracing-based mm-wave beamforming assessment", IEEE Access, vol. 2. Oct. 31, 2014, pp. 1314-1325.

Pascual-Garcia, Juan, et al. "On the importance of diffuse scattering model parameterization in indoor wireless channels at mm-wave frequencies", LEEE Access, vol. 4. Feb. 2016, pp. 688-701.

Jarvelainen, J. et al. "Sixty gigahertz indoor radio wave propagation prediction method based on full scattering model", Radio Science. Apr. 22, 2014, pp. 293-305.

* cited by examiner

300 →

TABLE 1

| Material type | Measured loss | Benchmark loss |
|---|---|---|
| Garage door (metal) | <3 dB | N/A |
| Refrigerator door | <3 dB | N/A |
| Window | 4 dB | 2-8 dB |
| Drywall | 14 dB | 9-15 dB |
| Cinderblock | 22 dB | 7-11 dB |
| Couch (fabric) | 30-40 dB | N/A |
| Stucco | 30 dB | 25-35 dB |

TABLE 2

| Material type | Measured loss | Benchmark loss |
|---|---|---|
| Hollow wood door | 17 dB | 12-18 dB |
| 2 drywall layers | 6 dB | 3-10 dB |
| Window | 4 dB | 2-6 dB |
| Couch (fabric) | 15 dB | N/A |

FIG. 4

LiDAR-DRIVEN mmWAVE BEAM MANAGEMENT

RELATED APPLICATION INFORMATION

This application claims priority to U.S. Provisional Patent Application No. 63/137,934, filed on Jan. 15, 2021, incorporated herein by reference in its entirety.

BACKGROUND

Technical Field

The present invention relates to mmWave communication and more particularly to LiDAR-driven mmWave beam management.

Description of the Related Art mmWave 5G networks promise to enable a new generation of networked applications requiring a combination of high throughput and ultra-low latency. However, in practice, mmWave performance scales poorly for large numbers of users due to the significant overhead required to manage the highly-directional beams.

Current approaches to mmWave beam selection rely almost exclusively on direct measurements of SNR/RSS in the environment. Due to the directionality of mmWave beams and sparsity of the mmWave channel, these approaches must frequently re-scan all possible beams to avert significant drops in performance. As mmWave networks have developed to include many users, higher mobility, and MIMO techniques, the overhead of completely re-scanning the environment has increased to such an extent that beam selection of overhead can significantly degrade the performance of the wireless link.

SUMMARY

According to aspects of the present invention, a method is provided for beam management. The method includes obtaining, by a Light Detection and Radar (LiDAR) sensor having one or more LiDAR cameras performing ray-tracing, out-of-band infrared measurements of a surrounding environment. The method further includes selecting, by a base station, a transmission and reception beam pair for use in the surrounding environment from a plurality of available transmission and reception beam pairs responsive to the out-of-band measurements of the surrounding environment.

According to other aspects of the present invention, a computer program product os provided for beam management. The computer program product includes a non-transitory computer readable storage medium having program instructions embodied therewith. The program instructions are executable by a computer in a base station to cause the computer to perform a method. The method includes obtaining, by a Light Detection and Radar (LiDAR) sensor having one or more LiDAR cameras in signal contact with the computer performing ray-tracing, out-of-band infrared measurements of a surrounding environment. The method further includes selecting, by a processor of the computer, a transmission and reception beam pair for use in the surrounding environment from a plurality of available transmission and reception beam pairs responsive to the out-of-band measurements of the surrounding environment.

According to yet other aspects of the present invention, a system is provided for beam management. The system includes a Light Detection and Radar (LiDAR) sensor having one or more LiIDAR cameras performing ray-tracing to obtain out-of-band infrared measurements of a surrounding environment. The system further includes a base station for selecting a transmission and reception beam pair for use in the surrounding environment from a plurality of available transmission and reception beam pairs responsive to the out-of-band measurements of the surrounding environment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a diagram showing a table 1 of reflection loss values for different objects, in accordance with an embodiment of the present invention;

FIG. 4 is a diagram showing a table 2 of transmission losses of large objects commonly found indoors, in accordance with an embodiment of the present invention.

DETAILED DESCRIPTION OF PREFERRED EMBODIMENTS

Figure 1:
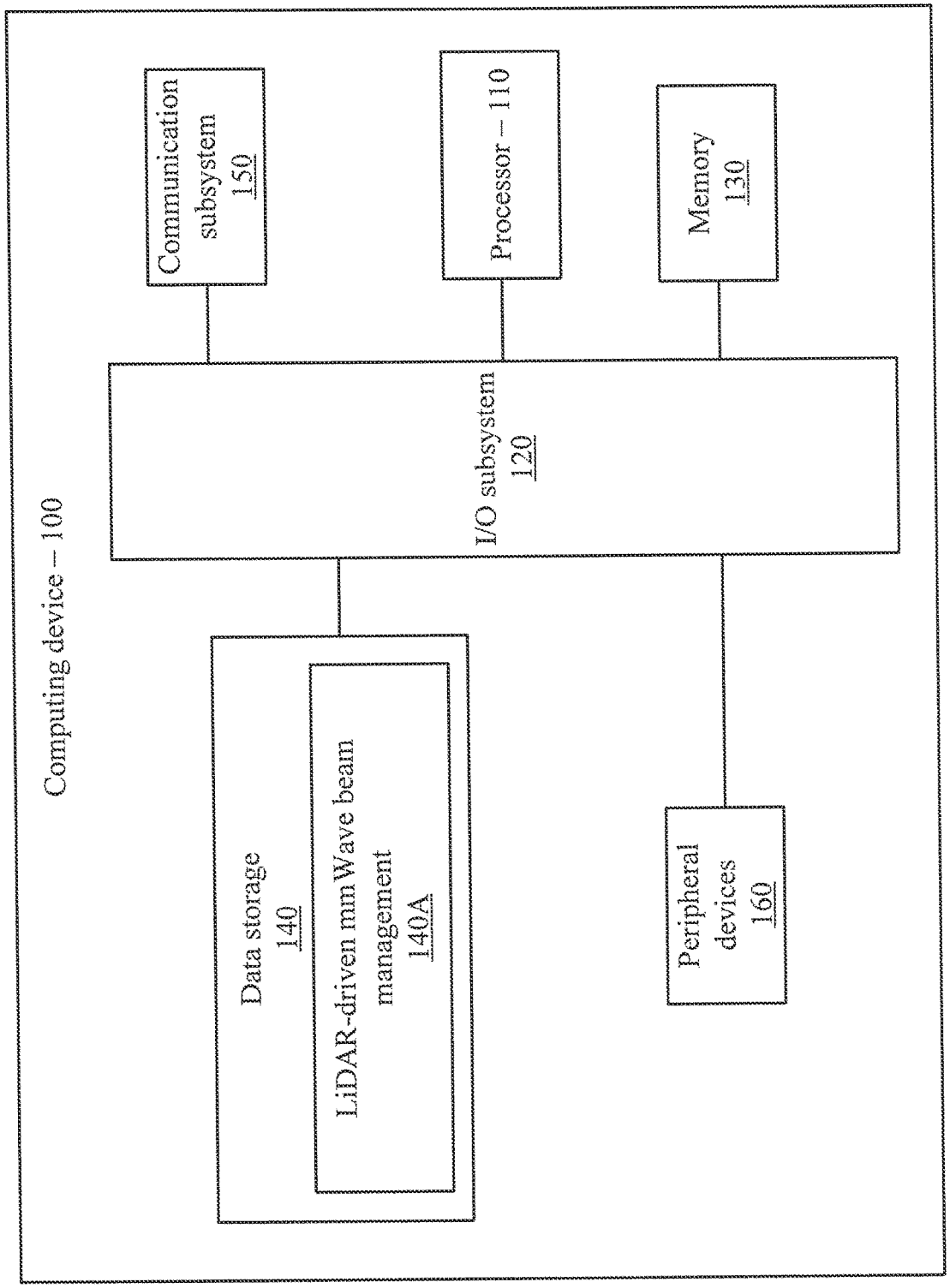
FIG. 1 is a block diagram showing an exemplary computing device, in accordance with an embodiment of the present invention.

Embodiments of the present invention are directed to LiDAR-driven mmWave beam management.

Embodiments of the present invention can substantially reduce or eliminate the significant overhead required to manage the highly-directional beams by using out-of-band infrared measurements of the surrounding environment generated by a LiDAR sensor. To accomplish this, embodiments of the present invention utilize a raytracing system that is robust to noise and other artifacts from the infrared sensor, estimate the reflection strength from sensor data, and apply this information to the multi-user beam selection process. We demonstrate that this approach reduces beam-selection overhead by over 95% in indoor multi-user scenarios.

Embodiments of the present invention utilize LiDAR-equipped RGBD cameras to construct 3D models of the immediate environment in real-time, along with a ray-tracing technique to determine candidate mmWave paths through the 3D map, before identifying the optimal mmWave path for each Tx/Rx pair. A single 3D model constructed from any point-of-view within the environment is sufficient for beam management of Tx/Rx devices throughout the mapped space.

Embodiments of the present invention provide a myriad of benefits, some of which are discussed below.

One-Shot Beam Assignment. Beam assignments are obtained using ray-tracing, rather than sequential probing of the mmWave space. With sufficient edge-compute resources, the optimized ray-tracing algorithm of the present invention can determine optimal beam assignment for any Tx/Rx pair with negligible latency. To further reduce beam assignment delays, the present invention pre-computes beam assignments over a dense 3D grid of possible Tx/Rx positions within the 3D model. A beam assignment request is then fulfilled via a simple look-up table to find the solution of the closest precomputed point, thus achieving true one-shot beam assignment capability.

Scalable Concurrent Beam Management. Beam assignments by the present invention do not require sequential beam probing and coordination between different mmWave devices. Hence, beam assignments for Tx/Rx pairs are computed or looked up concurrently, thereby eliminating a large scalability bottleneck in large, dense mmWave networks.

These contributions are possible due to solutions in embodiments of the present invention to the challenges of 3D sensor noise and finding surface material types:

C1: Noise tolerance in real-time 3D maps. Embodiments of the present invention can employ a novel path averaging and pruning step to (a) increase ray-tracing tolerance to errors in Tx/Rx positioning and (b) reduce the impact of 3D scanning noise.

C2: Material reflection coefficient. The present invention includes a robust approach to inferring surface material types of objects in the environment. RGB-D LiDAR cameras use an IR laser illuminator for ranging. In RGB-D cameras, the intensity of the IR transmitter is detectable by the visible light sensor. The specular and scattering properties of the surface scatter the impinging IR beams, resulting in an intensity pattern of IR light with varying bright and dark patches. The IR receiver on LiDAR systems enables direct access to these IR intensity values. Embodiments of the present invention can use a heuristic that maps these intensity patterns to estimated mmWave reflection losses of these surfaces with high accuracy.

FIG. 1 is a block diagram showing an exemplary computing device 100, in accordance with an embodiment of the present invention. The computing device 100 is configured to perform LiDAR-driven mmWave beam management.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for LiDAR-driven mmWave beam management. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
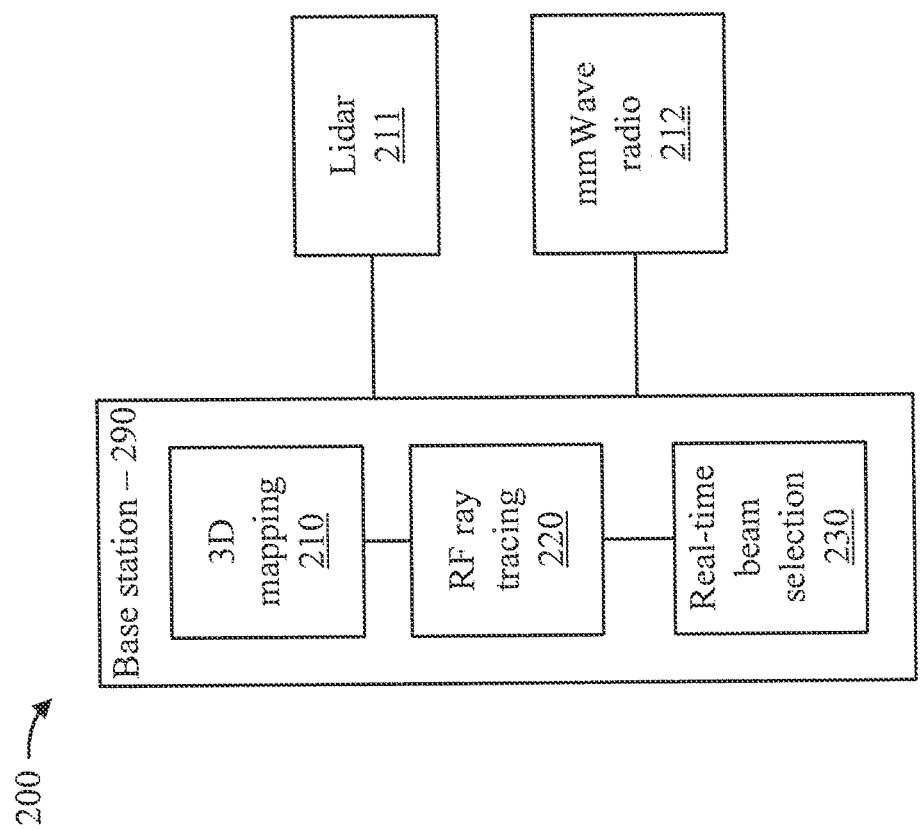
FIG. 2 shows an exemplary system for LiDAR-driven mmWave beam management, in accordance with an embodiment of the present invention.

These and other variations of a hardware processor subsystem are also contemplated in accordance with embodiments of the present invention FIG. 2 shows an exemplary system 200 for LiDAR-driven mmWave beam management, in accordance with an embodiment of the present invention. In an embodiment, the system is a base station 290.

Embodiments of the present invention provide a LiDAR-driven mmWave beam selection solution that operates in three phrases: 3D mapping 210, RF ray tracing 220, and real-time beam selection 230. The base station 290 is coupled to and/or otherwise includes a LiDAR-equipped RGB-D camera 211 and a mmWave radio 212.

3D mapping 210: The present invention first generates a 3D map of the surrounding physical environment and captures the characteristics of the physical materials to better inform the ray-tracer in the later step. The present invention scans the environment with a LiDAR-equipped RGB-D camera 211. Since our sensor may have a ranging error variance of up to 11 mm, a robust reconstruction method is used incorporating a color-aware variant of the Iterative Closest Point (ICP) to align frames and Truncated Signed Distance Function (TSDF) mesh reconstruction. Centimeter-level accuracy is typical for many other commercially-available LiDAR sensors, including those manufactured by Velodyne® and Intel®. Concurrently, the present invention uses a novel method for estimating the reflection characteristics of mmWave signals by measuring the environment materials' near-IR scattering characteristics with a depth camera.

RF ray tracing 220: The 3D map includes reconstruction noise due to the limited accuracy (±1 cm) of the RGB-D camera 211. The present invention uses a customized ray-tracing algorithm that works effectively on the noisy 3D map generated in the first phase. Embodiments of the present invention can identify real RF paths in a 3D mesh, and reject false reflection paths caused by reconstruction noise.

Real-time beam selection 230: Finally, the present invention uses the outcomes of ray-tracing to select the beams for each given Tx/Rx position pairs. Given a static (or quasi-static) environment, embodiments of the present invention can precompute beam assignments for a 3D grid of points that spans the entire 3D map. These grid points are spaced 28 cm apart, as our evaluations indicate that that offers the optimal trade-off between computation overhead and beam accuracy. Most environments include some amount of mobility. In particular, people are mobile and tend to create significant blockages. The present invention handles these environment changes in real time by detecting unexpectedly low SNR and switching to an alternate precomputed beam. When significant changes in the quasi-static environment occur, the present invention can recompute the complete lookup table for the environment in under 15 minutes.

Material Identification

Direct estimation of reflection coefficients using 3D mapping data is challenging because the visible and near-infrared sensing data is challenging because the visible and near-infrared sensing data cannot fully represent the mmWave interaction properties of an object. For example, different locations along the same wall could exhibit different mmWave reflection characteristics, due to interference from the multiple layers of material inside the wall. Dry/wet concrete and multi-pane/single-pane windows, though hardly distinguishable by LiDAR, may also reflect/attenuate the mmWave signals differently.

However, we note that it is not necessary to find an exact reflection coefficient to guide the mmWave beam selection. In fact, it is well known that the mmWave channel is sparse in both indoor and outdoor environment-between a pair of transmitter and receiver, only the LoS and 3-5 dominant NLoS reflection paths determine the angle and strength of signals. Therefore, for beam selection, the primary purpose of material identification is to identify objects with significant reflection loss, which will not perform as well as reflectors. The secondary purpose is to rank the remaining objects, to find the strongest available reflectors.

RF Interaction Characteristics

To understand the potential effects of material variation, the present invention measures the reflection loss of a variety of large objects indoor. We conduct these measurements by placing a mmWave transmitter and receiver 212 at 45 degree angles to the reflecting surface, measuring the peak RSS value at the reflected angle, and then compensating for antenna gains and free space path loss. The present invention determines transmission losses by placing different objects in the direct path and blocking all other paths using RF absorbers.

FIG. 3 is a diagram showing a table 300 of reflection loss values for different objects, in accordance with an embodiment of the present invention.

The measurement results show a wide variation in reflection loss values across different materials. Metal objects, as well as windows, have low reflection losses. Wall materials, such as drywall, generally have moderate reflection losses of less than 18 dB. These objects may still be usable as reflectors in most scenarios. Based on these measurements, each material is categorized as a strong reflector (<8 dB reflection loss), medium reflector (8-18 dB reflection loss), or weak reflector (>18 dB reflection loss).

FIG. 4 is a diagram showing a table 400 of transmission losses of large objects commonly found indoors, in accordance with an embodiment of the present invention.

As was the case with reflections, a large variation of transmission losses across different materials is observed.

Figure 5:
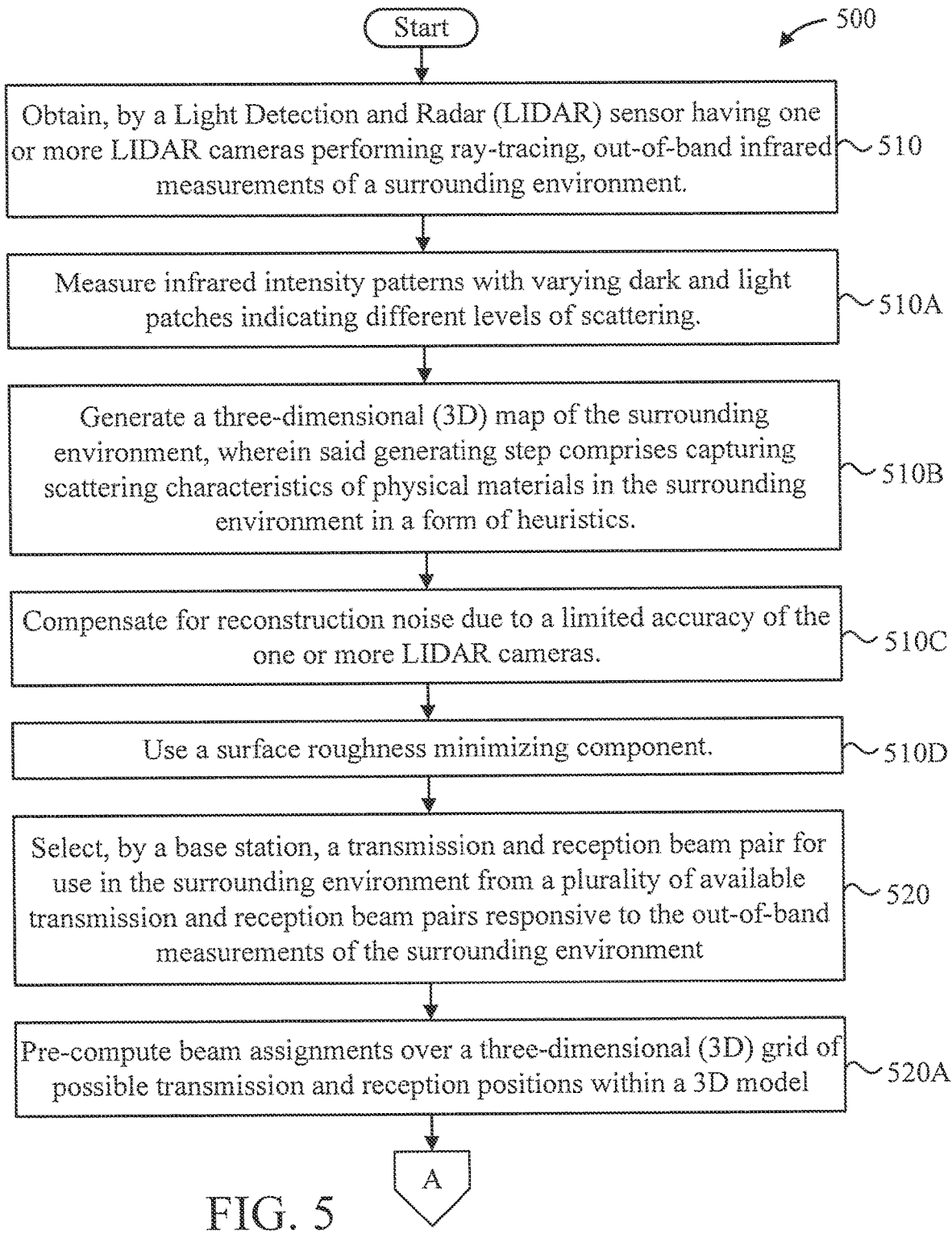
FIGS. 5-6 are flow diagrams showing an exemplary method for LiDAR-driven mmWave beam management, in accordance with an embodiment of the present invention.
Figure 6:
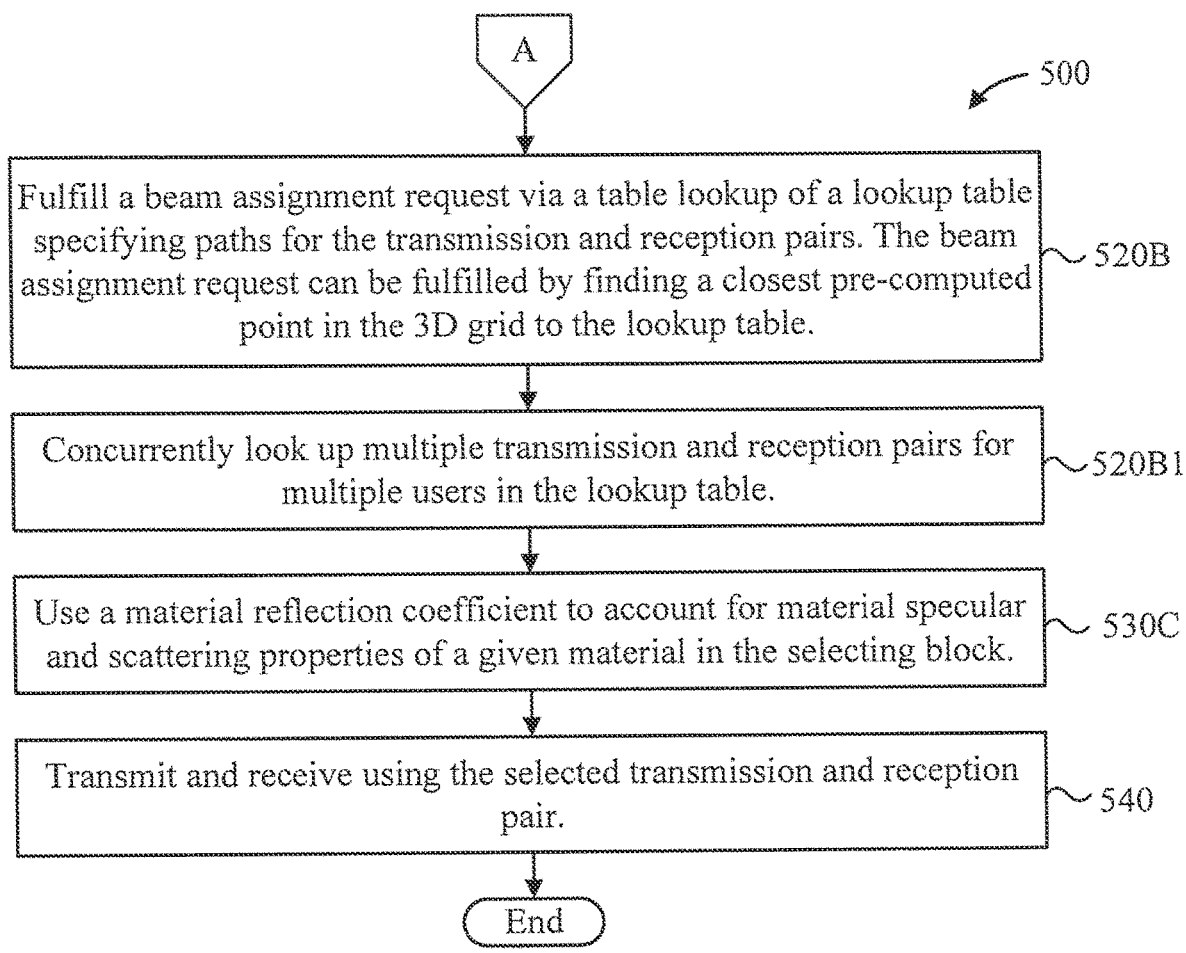

FIGS. 5-6 are flow diagrams showing an exemplary method 500 for LiDAR-driven mmWave beam management, in accordance with an embodiment of the present invention.

At block 510, obtain, by a Light Detection and Radar (LiDAR) sensor having one or more LiDAR cameras performing ray-tracing, out-of-band infrared measurements of a surrounding environment.

In an embodiment, block 510 can include one or more of blocks 510A through 510D.

At block 510A, measure infrared intensity patterns with varying dark and light patches indicating different levels of scattering.

At block 510B, generate a three-dimensional (3D) map of the surrounding environment, wherein said generating step comprises capturing scattering characteristics of physical materials in the surrounding environment in a form of heuristics.

At block 510C, compensate for reconstruction noise due to a limited accuracy of the one or more LiDAR cameras.

At block 510D, use a surface roughness minimizing component.

At block 520, select, by a base station, a transmission and reception beam pair for use in the surrounding environment from a plurality of available transmission and reception beam pairs responsive to the out-of-band measurements of the surrounding environment [TBD—can we be a little more specific here regarding responsive to the measurements].

In an embodiment, block 520 can include one or more of blocks 520A through 520C.

At block 520A, pre-compute beam assignments over a three-dimensional (3D) grid of possible transmission and reception positions within a 3D model of reflected power modelled as a combination of specular reflection and diffuse scattering within the surrounding environment.

At block 520B, fulfill a beam assignment request via a table lookup of a lookup table specifying paths for the transmission and reception pairs. The beam assignment request can be fulfilled by finding a closest pre-computed point in the 3D grid to the lookup table. Broadly speaking, the lookup table will include three columns of information: the Tx and Rx positions; and the corresponding beams that should be used to reach the Rx from the Tx. The resolution of the lookup table depends on how fine-grained we sample the space during pre-computation, and the format of the beam specifications depends on the mmWave hardware that is deployed.

In an embodiment, block 520B can include block 520B1.

At block 520B1, concurrently look up multiple transmission and reception pairs for multiple users in the lookup table.

At block 530C, use a material reflection coefficient to account for material specular and scattering properties of a given material in the selecting block.

At block 540, transmit and receive using the selected transmission and reception pair.

Reflection Modelling

To avoid the need for direct measurements, we propose to use the RGBD camera to estimate the signal losses due to mmWave reflections. To understand how to achieve this estimation, the different factors that determine how mmWave signals interact with objects are first briefly examined.

In general, radio waves arriving at a surface are either transmitted through the surface or reflected from the surface. The relationship between the reflected and transmitted waves is described by the Fresnel coefficients, which in turn depend on the refractive index of the surface (as well as the permeability for magnetic surfaces). The reflected power may be modelled as a combination of specular reflection and diffuse scattering. Interference-based models assume that diffuse scattering occurs when differences in the height of the surface lead to variations in path length across the wavefront. Then, different parts of the wave arrive at the receiver at different times, leading to constructive and destructive interference patterns. If these height differences are periodic, they will generate additional strong backscatter at incidence angles that satisfy $2d \cos \theta_i = n\lambda$, where d is the height of the periodic roughness, $\lambda$ is the signal wavelength, and n is any positive integer. The resulting attenuation along the specular reflection path is $$\frac{R}{R_0} = \exp\left[-8\left(\frac{\pi \Delta h \cos \theta_i}{\lambda_0}\right)\right],$$

where $\Delta h$ is the standard deviation of the surface height, and $R_0$ is the reflection coefficient calculated using the Fresnel equations.

Clearly, it is not trivial to calculate the Fresnel coefficients, since the relevant electrical characteristics vary with frequency. It is possible to infer these values in a coarse manner by using an image classification algorithm, but this requires intensive training over a large database of object types, together with environment-specific tuning. On the other hand, surface scattering shows more promise as it can be modelled using parameters that are frequency-independent. To accomplish this, LiDAR data is leveraged. Unfortunately, the depth resolution of typical IR sensors is insufficient to reveal the relevant surface variation. For example, the Azure Kinect depth camera specifies depth errors of over 1 cm within its ordinary operating conditions, whereas mmWave reflections may be affected by surface height variation of under 1 mm. Other common LiDAR sensors, such as those manufactured by Intel® or Velodyne®, also have centimeter-level accuracy.

Instead, we directly measure diffuse scattering at the near-IR wavelength. This is accomplished using IR intensity data captured by many LiDAR devices, including the CMOS sensors found in the Azure Kinect® and iPhone® Pro and more traditional mechanical LiDARs such as those made by Velodyne®. A surface with significant diffuse scattering due to surface roughness at mmWave frequencies will also exhibit diffuse scattering near-IR frequencies. The converse is not always true, since shorter wavelengths are affected by increasingly small surface variations, but we find that the correlation is strong enough to reliably identify the strongest reflectors.

Sensing Material Roughness

To show that this intuition regarding scattering from rough surfaces is useful for predicting mmWave reflection loss, a simple mechanism has been designed that uses IR intensity values measured by the depth camera to infer the mmWave scattering characteristics. Since the backscatter at near-IR wavelengths is affected by factors such as paint type as well as surface roughness, the present invention first measures the strength of the specular reflection. Since the IR camera is measuring returns from an onboard IR laser, a specular reflection exists at the point on the surface where the normal of the surface points towards the camera. The present invention compares the IR luminosity at this point to the luminosity at nearby points on the surface. We then apply a Gaussian blur to the IR camera image to reduce the effect of macro-scale surface roughness and other small details on the object. Since the IR laser in the camera produces an uneven diffraction pattern, the peak to average power ratio is averaged over 10 consecutive frames, such that the diffraction pattern is translated across the surface by a sufficient distance.

To determine the relationship between diffuse IR scattering and mmWave reflection loss, the present invention takes multiple IR measurements on each of the surfaces shown in Table 1 300 of FIG. 3, along with a number of additional interior walls.

Robust Raytracing with Noisy 3D Models

The first step in raytracing-based mmWave beam selection is locating the primary reflectors. One may consider using the LiDAR camera to construct 3D models of the environment, including the reflectors' geometries. However, when feeding the reconstructed 3D model of an environment to the state-of-the-art Wireless Insite ray tracer, it has been found that nearly half of the known RF paths in a typical indoor scenario do not appear at all. In many cases, a large surface such as a wall which obviously should create a reflection does not show any reflections at all.

This problem is the results of the assumptions of standard RF path-tracing solutions. Most RF path-tracing assumes that their 3D model is structured like a CAD model, formed from large, exact faces, such that we can locate an exact point where any given reflection or transmission occurs. LiDAR-derived models break these assumptions. First, they are never exact. LiDAR-based models include noise and other artifacts, such that it is not possible to find exact locations for all paths. Second, the reconstruction is dense. Our mesh is reconstructed from a set of voxels of a fixed size, 5 mm in our case. A single large surface in the real world, such as a wall, is composed of a large number of small triangles in a LiDAR model, each of which has a slightly different normal vector direction. Since the RF reflection location is determined by the normal vector, in many cases no triangle in the set that includes a wall or similar surface exactly matches the criteria of a specular reflection.

A straightforward solution to this problem would be to create a mesh reconstruction that is as close to the expected CAD-like format as possible. To this end, we generate a point cloud from our 3D model, then repeatedly run the RANSAC algorithm to find subsets of our point cloud that form planes. For each subset of points, the present invention first creates an infinite plane by finding a normal vector and location that best fits the subset. The present invention divides this plane into 10 cm squares, and remove the squares that do not contain any points. By removing unsupported squares, the present invention avoids unintentionally blocking open doorways and similar areas that lie behind part of a planar surface. This technique significantly reduces the mesh noise problem, and it has been found that the accuracy of standard RF path tracing improves significantly in an environment that includes large, flat surfaces. Unfortunately, this method is not applicable in a more crowded environment with many non-flat objects.

To overcome the challenge, the ray tracing process itself is modified to be robust to significant noise in the 3D model. To capture the missed paths, a small tolerance is introduced in the reflection angle based on the measured error characteristics of the system. On the other hand, the 3D model will include many surfaces too small to produce a reflection strong enough for use in communications. A way must then be found to reject the spurious paths due to reflections from these small surfaces. The present invention provides a pair of simple tests that, when used together, detect and remove the vast majority of such paths.

Approximate Path Generation

Classical RF modeling methods such as Shooting and Bouncing Rays (SBR) use ray tracing to find the primary propagation paths in an environment. In general, SBR works by initializing a set of rays with a uniform spacing of $\Delta\theta_{ray}$ in the elevation and azimuth directions. For each ray, it then finds the first location where the ray intersects another object in the environment. If this first intersection is located at the receiver, then the SBR algorithm terminates for that ray. Otherwise, it creates a new ray in the direction of the specular reflection $\hat{r}_s = 2(\hat{r}_i \cdot \hat{n})\hat{n} - \hat{r}_i$, where $\hat{r}_i$ is the unit vector indicating the direction of the incident wave. It may also create a refracted wave that passes through the surface. For each new ray, it proceeds to recursively find a path to the receiver, unless we reach a predetermined limit on the number of reflections and refractions.

The immediate problem with the conventional RF retraces is that they assume for each propagation path m, there exists some set of rays $\{\vec{r}_n\}_m$, such that these specular reflections lead to the exact location of the receiver. In a dense triangle mesh model of the environment where the normal vector of each face may include a substantial amount of noise, such a set of rays frequently does not exist. To accommodate mesh noise, the present invention introduces an error tolerance of $\Delta\theta_{\hat{n}}$ for the angle of the normal vector used to calculate the direction of the specular reflection. If the final ray to the receiver has an angle that falls within $$\frac{1}{2}\Delta\theta_{\hat{n}},$$

the ray is counted as having arrived at the receiver.

Selecting the Error Tolerance

A key question is how to select the tolerance parameter $\Delta\theta_{\hat{n}}$. Selecting an excessively large value lead to the detection of false paths reflecting off small objects. The additional RF paths will also slow down later processing steps. On the other hand, a value that is too small may lead to missed detection of valid RF paths.

To make a better tradeoff, the present invention needs to determine the statistical properties of the error in the normal vectors derived from our mesh reconstruction of the environment. In conventional mesh reconstruction algorithms, errors in positions of vertices in the mesh are a result of imprecise range estimation and pose estimation of the 3D sensor. Due to the large number of factors involved in 3D mesh reconstruction, it is generally not possible to find mesh error probabilities analytically. Instead, prior work determined mesh error characteristics using a simple calibration procedure involving measuring a flat surface from multiple angles and distances. Using this data, the present invention finds the difference between the mesh generated by the 3D sensor and the reference normal value from a plane fitted to the point cloud representation of the wall. By finding the distribution of the differences between the normals of individual triangles and the reference normal value, the present invention can estimate the prevalence of missed paths at a given $\Delta\theta_{\hat{n}}$ value. Since mesh error depends on the system configuration, and not on the environment, this calibration only needs to be completed once per combination of sensor, measurement platform, and reconstruction method. The present invention can complete this calibration using a large wall measured at three distances.

Path Clustering

The aforementioned method finds missing paths neglected by exact path discovery methods, but it also generates additional paths near the actual path, since the increased error tolerance in the reflection angle will allow a larger number of the initial rays to reach the receiver. For a small angle tolerance $\Delta\theta_{\hat{n}}$ specified in degrees, the present invention can find additional rays within a radius of $$r = 2(1 + \tan^2(\theta_i))\frac{\pi}{180}\Delta\theta_{\hat{n}}$$

on a flat surface.

To eliminate these additional paths, the present invention first groups the paths using a clustering algorithm. The present invention can use hierarchical agglomerative clustering with a single-linkage criteria to identify the number of path clusters and their contents in $O(n^2)$ time. Since the set of mmWave paths is sparse, clusters are nearly always far apart and the single-linkage threshold does not need to be determined precisely. In this scenario, it is not productive to find the point where the reflection angle is closest to the ideal specular angle, since this result heavily depends on the noisy normal values that causes our original problem. Instead, the present invention takes the mean of each reflection point in the path cluster to merge each cluster into a single path.

Spurious Path Pruning

A second problem we face is spurious paths reflecting off very small surfaces such as the edge of a table or LCD panel, or reflecting off of small artifacts caused by reconstruction errors. The reflected mmWave power should be small as it is proportional to the surface area of the reflection facet. The prior results of ray-tracing find paths off both large surfaces and very small surfaces, so an additional step has been created to differentiate between these two types of reflections.

Since a detailed mesh reconstruction is formed of many small triangles, even for a large flat surface, it is usually not possible to directly measure the size of the face causing the reflection. Instead, to eliminate these spurious paths, the present invention leverages two geometric intuitions about the nature of the ray-tracing results. First, it is observed that mmWave phased arrays are not point sources, and that the signal should include a coherent combination of signals from the entirety of the phased array. Therefore, to test whether the reflector is large enough to reflect power from the entire phased array, six points are selected around the edges of the transmit and receive phased arrays (which are 4×4 cm in our case), and ray tracing is re-run using these new transmitter and receiver locations. The same clustering method discussed above is sued to associate the paths discovered across these multiple raytracing rounds. Then, if a cluster is present in all of the Tx/Rx location pairs, it is accepted as a valid path. Otherwise, it is rejected as spurious.

Second, recall that increasing the angle tolerance $\Delta\theta_{\hat{n}}$ will lead to a roughly circular disc-shaped set of reflection points on a large, flat surface. Spurious paths will be confined to either a single point or a line of points. To distinguish between small and large reflection surfaces, it is intended to determine the total area of the reflection surface. Directly determining the total reflection surface across all ray traced paths using a method such as finding the convex hull is inefficient for large numbers of paths. Instead, it has been observed that the size of the faces in our mesh will be roughly uniform because the reconstruction process is based on voxels. Thus, we can use the number of faces detected as reflectors as a proxy for the area of the reflection surface.

To this end, it is intended to find a threshold for the minimum number of faces needed for claiming a sufficiently large reflecting face. First, it is noted that the area detected should be at least as large as the phased array (e.g., 16 cm² in the exemplary implementation). The number of triangles within this area is determined using the voxel size used during a reconstruction (5 mm). For any mesh triangle a distance r from the ideal reflecting point, the probability of the normal vector falling within the range of a specular reflection is $$P_{match} = P\left[\theta_{err} < \Delta\theta_{\hat{n}} - \frac{360}{\pi}\frac{r}{1+\tan^2(\theta_i)}\right]$$

where all angles are specified in degrees. Using the empirical normal error CDF found using our calibration procedure, it is computed that there is a 99% chance that a flat reflector with an area of 16 cm² will have at least xx triangles detected as reflectors during ray tracing.

Real-Time Beam Selection

Embodiments of the present invention apply beam power estimation techniques to mmWave network configurations. Here, the present invention is primarily directed to the unique challenges presented when we use ray-tracing prediction, rather than run-time network measurement, to handle this configuration. The first is achieving real-time beam selection with ray-tracing, which itself may take significant computation time. To ensure that the beams can be updated in time, a lightweight lookup table scheme is employed to cache the path parameters available at each location. Second, our 3D model is quasi-static, and receives only infrequent updates due to the computational overhead in model constructions. This would not affect reflector localization and identification, since most dynamic objects indoor, such as people and furniture, are not strong mmWave reflectors. However, blockages such as people are often highly mobile, and run-time 3D modeling of blockages is computationally infeasible. In addition, our system cannot predict reflection or blockage losses with complete accuracy in all situations. To address these problems, we make use of a fast failover mechanism to quickly handle unexpectedly weak or blocked paths.

Ray-Tracing Precomputation

Although our method nearly eliminates the communication overhead in traditional beam scanning, the computational complexity associated with ray-tracing is substantially greater. In mobile scenarios, the additional latency introduced between a change of node location and update of beam selection for each user can lead to highly sub-optimal network configurations. To avoid this problem, the present invention precomputes a look-up table to store the available paths between any pair of transmitter/receiver locations, rather than computing these values in real time. This solution works for even low-profile embedded devices, and may easily be executed in MAC-layer firmware.

The look-up table requires that we partition the 3D space into a discrete number of spots. At runtime, the transmitter and receiver can simply associate themselves to the nearest spots and retrieve the cached path information. A finer grained partition may ensure higher precision, but result in a larger table. To understand the relevant real-time constraints, we first conduct a set of experiments to determine the effect of an offset between the actual current location and the location used to find a ray-tracing solution. Embodiments of the present invention collect real mmWave measurements and use a LiDAR device to measure the precise location of the radio to within ±2 cm. There is an increase in angle prediction error as a function of the distance between the actual position of the radio and the location used for ray-tracing, calculated using the same methodology used to evaluate ray-tracing performance. Since our half-power beam width is 10, when the angle errors greater than 5 occur, beginning around 20 cm location offset, the communications performance begins to degrade. For LoS paths, the maximum effect of location offset on angle of departure occurs when the user is closest to a base station, where the angle of departure to the user may change by up to $$\frac{180}{\pi r}$$

degrees for each meter the user moves, where r is the distance between the user and base station. NLoS paths are also affected by the locations of reflectors, but the reflectors we use are much larger than 20 cm in width and height, meaning that performance drops due to an angle offset generally occur first. In a network consisting of two users and two access points, in this test case, the system performance begins to drop once the users are more than 20 cm from their ray-tracing locations. Based on this data, it is concluded that any given ray-tracing solution may be used with a sphere of radius 20 cm, centered around the radio location used during ray-tracing. To ensure that the user is never more than 20 cm from a precomputed solution, a grid of points is created 28 cm apart. A lookup table including the precomputed beams and their signal strengths for any point in the entire volume of the crowded room would be under 50 kilobytes, and a similar table for the empty room would take less than 40 kilobytes of memory. Since this data only needs to be loaded once per room, the overhead of retrieving and storing this data would be negligible for almost any device that requires high-throughput communications.

Fast Failover

The second problem we need to handle lies in the blocked or otherwise missing paths. Our previous reflection in strength measurements show that the strongest reflectors in indoor environments are generally quasi-stationary objects such as walls, windows, and large metal objects. Smaller, more mobile objects only produce specular reflections at a limited range of locations. However, many mobile objects, especially people, are strong blockages, and may cause substantial attenuation.

To handle new blockages that occur when a blocker moves into the currently-active beam, the present invention senses drops in SNR of packets that we receive on the connection. Since a small drop in SNR precedes a full blockage, we can select a new beam before the old beam disappears. When we switch to a new beam, either to enable multi-user multiplexing, or to handle a new blockage, we also need to check for dynamic blockages along the new selected beam, before the new beam is used. To check for blockage along a new path, the present invention leverages limited, low-overhead measurements using the Beam Refinement Protocol (BRP) built-in existing mmWave devices such as 802.11ad. BRP is intended to scan a smaller number of sectors to improve the beam selection after a broad beam sweep is completed and a rough beam alignment is available. The device which initiates BRP may specify the exact beams to check. As such, it requires significantly less time to complete than a standard sector sweep. To minimize the overhead of this process in the case where blockage is discovered, the present invention scans the top 3-available paths, ranked by the expected signal strength. Any path where the measured signal strength is significantly lower than the expected signal strength is considered blocked, and is skipped.

Extension to mmWave Interference Management

The default 802.11ad protocol measures the RSS for each possible transmit beam for each AP/client pair. After each transmitter sector sweep, the receiver replies with the best sector and the SNR for that sector. It may also use the BRP to measure specific transmit/receive beam pairs. However, the protocol does not include mechanisms to share signal per-beam interference information during beam selection. To mitigate the negative effects of interference, the protocol includes mechanisms to create a PCP/AP cluster, which always neighboring APs and clients to detect and share when a network node overhears traffic from a neighboring network node. This information is used to ensure that the beacon intervals (BIs) used for beam training do not overlap, and may also be used for TDMA service period scheduling, to avoid interference during data transmission.

The many-to-many beam alignment protocol gives a mechanism for reducing inference via AP and beam selection, as well as interference-aware TDMA for multi-AP mmWave networks. Using the present invention, a radio requires 1 ms to complete a sector sweep on a single pair of transmit and receive antennas. To achieve full omnidirectional coverage, the present invention performs the sector sweep on at least three antennas per node. Since the sector sweep phase does not transfer full SNR measurements, the present invention also completes a beam refinement phase (BRP) transaction to share per-sector SNR values with the APs. This phase requires an additional 1.4 ms per node.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for beam management comprising:
    obtaining, by a Light Detection and Radar (LIDAR) sensor having one or more LiDAR cameras performing ray-tracing, out-of-band infrared measurements of a surrounding environment; and
    selecting, by a base station, a transmission and reception beam pair for use in the surrounding environment from a plurality of available transmission and reception beam pairs responsive to the out-of-band measurements of the surrounding environment by:
        pre-computing beam assignments over a three-dimensional (3D) grid of possible transmission and reception positions within a 3D model of reflected power modelled as a combination of specular reflection and diffuse scattering within the surrounding environment; and
        fulfilling a beam assignment request via a table lookup of a lookup table specifying paths for the transmission and reception beam pairs.

2. The method of claim 1, wherein the beam assignment request is fulfilled by finding a closest pre-computed point in the 3D grid to the lookup table.

3. The method of claim 1, further comprising concurrently looking up multiple transmission and reception pairs for multiple users in the lookup table.

4. The method of claim 1, further comprising increasing ray-tracing tolerance to errors in transmission and reception positions by identifying real Radio Frequency RF paths in a 3D mesh and rejecting false reflection paths caused by 3D model reconstruction noise.

5. The method of claim 1, wherein a material reflection coefficient is used to account for material specular and scattering properties of a given material in said selecting step.

6. The method of claim 5, wherein said obtaining step comprises measuring infrared intensity patterns with varying dark and light patches indicating different levels of scattering.

7. The method of claim 1, wherein said obtaining step comprises generating a three-dimensional (3D) map of the surrounding environment, wherein said generating step comprises capturing scattering characteristics of physical materials in the surrounding environment in a form of heuristics.

8. The method of claim 7, further comprising rejecting false reflection paths caused by reconstruction noise in the 3D map, wherein the false rejection paths are identified based on approximate path generation, path clustering and spurious path pruning.

9. The method of claim 1, further comprising compensating for reconstruction noise due to a limited accuracy of the one or more LIDAR cameras.

10. The method of claim 1, further comprising identifying actual RF paths and false reflection paths in the 3D grid based on an amount of reconstruction noise.

11. The method of claim 1, further comprising recomputing the 3D grid responsive to changes in the surrounding environment greater than a threshold amount.

12. The method of claim 1, wherein obtaining the out-of-band measurements of the surrounding environment comprises deploying a surface roughness minimizing component.

13. A computer program product for beam management, the computer program product comprising a non-transitory computer readable storage medium having program instructions embodied therewith, the program instructions executable by a computer in a base station to cause the computer to perform a method comprising:
    obtaining, by a Light Detection and Radar (LiDAR) sensor having one or more LiDAR cameras in signal contact with the computer performing ray-tracing, out-of-band infrared measurements of a surrounding environment; and
    selecting, by a processor of the computer, a transmission and reception beam pair for use in the surrounding environment from a plurality of available transmission and reception beam pairs responsive to the out-of-band measurements of the surrounding environment by:
        pre-computing beam assignments over a three-dimensional (3D) grid of possible transmission and reception positions within a 3D model of reflected power modelled as a combination of specular reflection and diffuse scattering within the surrounding environment; and
        fulfilling a beam assignment request via a table lookup of a lookup table specifying paths for the transmission and reception beam pairs.

14. The computer program product of claim 13, wherein the beam assignment request is fulfilled by finding a closest pre-computed point in the 3D grid to the lookup table.

15. The computer program product of claim 13, wherein the method further comprises concurrently looking up multiple transmission and reception pairs for multiple users in the lookup table.

16. The computer program product of claim 13, wherein the method further comprises increasing ray-tracing tolerance to errors in transmission and reception positions by identifying real Radio Frequency RF paths in a 3D mesh and rejecting false reflection paths caused by 3D model reconstruction noise.

17. The computer program product of claim 13, wherein a material reflection coefficient is used to account for material specular and scattering properties of a given material in said selecting step.

18. A system for beam management comprising:
    a Light Detection and Radar (LIDAR) sensor having one or more LIDAR cameras performing ray-tracing to obtain out-of-band infrared measurements of a surrounding environment; and
    a base station for selecting a transmission and reception beam pair for use in the surrounding environment from a plurality of available transmission and reception beam pairs responsive to the out-of-band measurements of the surrounding environment by:
        pre-computing beam assignments over a three-dimensional (3D) grid of possible transmission and reception positions within a 3D model of reflected power modelled as a combination of specular reflection and diffuse scattering within the surrounding environment; and fulfilling a beam assignment request via a table lookup of a lookup table specifying paths for the transmission and reception beam pairs.

* * * * *